US011424829B2

(12) United States Patent
Greer et al.

(10) Patent No.: US 11,424,829 B2
(45) Date of Patent: Aug. 23, 2022

(54) SYSTEMS AND METHODS FOR INTERFACING OPTICAL LINE TERMINALS WITH OPTICAL MODULES

(71) Applicant: ADTRAN, Inc., Huntsville, AL (US)

(72) Inventors: Jerry Greer, Huntsville, AL (US); Jared Lee Oldacre, Madison, AL (US); Vern Brethour, Owens Crossroads, AL (US)

(73) Assignee: ADTRAN, Inc., Huntsville, AL (US)

( * ) Notice: Subject to any disclaimer, the term of this patent is extended or adjusted under 35 U.S.C. 154(b) by 0 days.

(21) Appl. No.: 17/352,876

(22) Filed: Jun. 21, 2021

(65) Prior Publication Data

US 2021/0399804 A1  Dec. 23, 2021

Related U.S. Application Data

(60) Provisional application No. 63/041,756, filed on Jun. 19, 2020.

(51) Int. Cl.
*H04J 14/00* (2006.01)
*H04B 10/2581* (2013.01)
(Continued)

(52) U.S. Cl.
CPC ....... *H04B 10/2581* (2013.01); *H04B 10/801* (2013.01); *H04Q 11/0067* (2013.01)

(58) Field of Classification Search
CPC .............. H04B 10/272; H04B 10/2581; H04B 10/801; H04B 10/2589; H04Q 11/0067; H04Q 11/00; H04Q 2011/0064; H04Q 11/0062; H04Q 11/0066; H04Q 11/0071; H04Q 2011/005; H04Q 2011/0037; H04Q 2011/0041; H04Q 2011/0047; H04J 14/0247; H04J 14/0252; H04L 12/44; H04L 1/0025; H04L 1/0026; H04L 1/0027
(Continued)

(56) References Cited

U.S. PATENT DOCUMENTS 5,649,001 A   7/1997  Thomas et al.
5,737,364 A   4/1998  Cohen et al.
(Continued)

OTHER PUBLICATIONS

International Search Report for PCT/US2021/038204 dated Sep. 23, 2021.
(Continued)

*Primary Examiner* — Hibret A Woldekidan
(74) *Attorney, Agent, or Firm* — Maynard Cooper & Gale, P. C.; Jon E. Holland

(57) ABSTRACT

Circuitry of an optical line terminal (OLT) can be controlled to be compatible with optical modules of different optical protocols having different electrical connectivity requirements. In some embodiments, the OLT has a controller that is configured to communicate with an optical module plugged or otherwise mated with a socket of the OLT in order to discover a module type of the optical module. Based on the detected module type, the controller is configured to control the electrical characteristics of the OLT circuitry so that it is compatible with the electrical and operational requirements of the optical module. Thus, the OLT is compatible for use with any of a plurality of optical module types.

22 Claims, 8 Drawing Sheets

(51) Int. Cl.
*H04Q 11/00* (2006.01)
*H04B 10/80* (2013.01)

(58) Field of Classification Search
USPC .................................. 398/67, 66, 70, 71, 72
See application file for complete search history.

(56) References Cited

U.S. PATENT DOCUMENTS

| | | | |
|---|---|---|---|
| 2012/0114331 A1* | 5/2012 | Kamijo | H04L 12/2885 398/35 |
| 2013/0004171 A1* | 1/2013 | Tamai | H04L 12/287 398/66 |
| 2013/0202300 A1 | 8/2013 | Dvir et al. | |
| 2014/0193150 A1* | 7/2014 | Mukai | H04B 10/272 398/67 |
| 2017/0126351 A1* | 5/2017 | Boyd | H04B 10/40 |
| 2019/0173980 A1 | 6/2019 | Detwiler et al. | |
| 2019/0306018 A1 | 10/2019 | Steverson et al. | |

OTHER PUBLICATIONS

"SFP+ 10 Gb/s and Low Speed Electrical Interface," SFF Committee, 2009, pp. i-iii and 4-6, SFF-8431 Rev 4.1 Addendum.
"Control Sheet," Ligent Intelligent Photonics, 2017, pp. 1-3, Rev. 2.7.
"LTF7226B XGS-PON OLT Transceiver," Hisense Broadband, Inc., 2020, pp. 1-2, Rev. 1.3.
"LTF5308B SFP+ OLT Transceiver," Hisense Broadband, Inc., 2021, pp. 1-2, Rev. 2.3.

* cited by examiner

SYSTEMS AND METHODS FOR INTERFACING OPTICAL LINE TERMINALS WITH OPTICAL MODULES

CROSS REFERENCE TO RELATED APPLICATION

This application claims priority to U.S. Provisional Application No. 63/041,756, entitled "Systems and Methods for Interfacing Optical Line Terminals with Optical Modules" and filed on Jun. 19, 2020, which is incorporated herein by reference.

RELATED ART

Passive optical networks are used extensively in telecommunication systems to provide high-speed optical communications between an optical line terminal (OLT) and a plurality of optical network terminals (ONTs). The OLT typically has a socket into which an optical module may be inserted. Such a module has an optical transceiver that may be used to communicate optical signals with the ONTs through optical fibers of the PON. In the downstream direction, the optical transceiver receives downstream data from the OLT and converts this data from the electrical domain to the optical domain for transmission to the ONTs. In the upstream direction, the optical transceiver receives data in the optical domain from the ONTs and converts the data into the electrical domain for transmission to the OLT. Thus, the optical module has an electrical connector that plugs into the socket of the OLT. This electrical connector comprises a plurality of pins that make electrical connections with circuits of the OLT to allow electrical communication between the OLT and the optical transceiver of the optical module.

Currently, there are several different optical protocols that may be used for optical communication across a PON, such as Gigabit-capable Passive Optical Network (GPON) and XGS-PON, for example. Typically, an optical module is configured to support a certain protocol. However, some optical modules are of a type capable of supporting multiple optical protocols. As an example, a Multi-PON module may simultaneously or separately support both GPON and XGS-PON.

The electrical connectors of optical modules of different types for supporting different optical protocols or combinations of optical protocols typically have the same mechanical specifications but may have different electrical and operational specifications. That is, the pin functionality and electrical requirements for optical modules of different types are typically different depending on the optical protocol or combination of optical protocols that are supported by the module. Thus, from an electrical perspective, the pin layout for an optical module of one type is typically different than the pin layout for an optical module of a different type, even though mechanically the pin layouts are the same. As an example, a pin at a given pin position for a GPON optical module may need to be grounded but a pin at the same pin position for a multi-PON optical module might carry high-speed data. As a result of different electrical and operational requirements across optical modules of different types, an OLT compatible with one type of optical module is typically incompatible with a different type of optical module.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to optical line terminal (OLT) circuitry that can be controlled to be compatible with optical modules of different optical protocols having different electrical connectivity requirements. In some embodiments, an OLT has a controller that is configured to communicate with an optical module plugged into or otherwise mated with a socket of the OLT in order to discover the module's type. Based on the detected module type, the controller is configured to control the electrical characteristics of the OLT circuitry so that it is compatible with the electrical and operational requirements of the optical module. Thus, the OLT is compatible for use with any of a plurality of optical module types.

Figure 1:
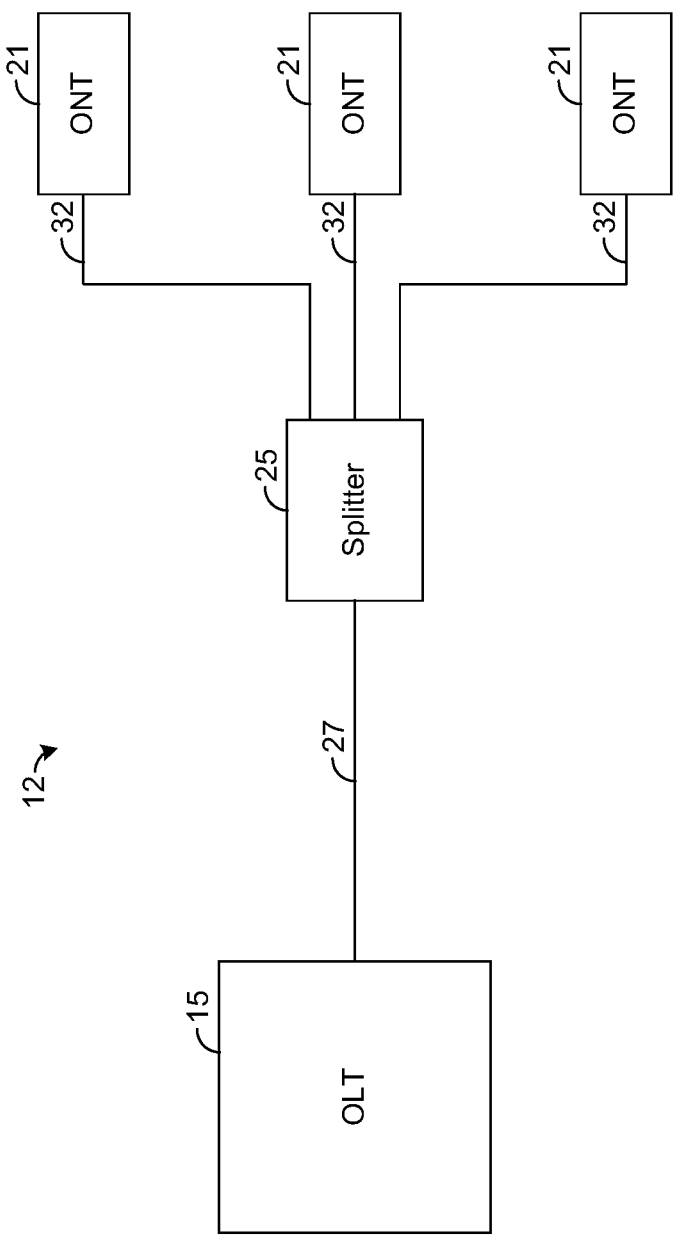
FIG. 1 is a block diagram illustrating an exemplary embodiment of an optical network.

FIG. 1 depicts an exemplary embodiment of an optical network 12. In some embodiments, the network 12 of FIG. 1 is a passive optical network (PON), but other types of optical networks are possible in other embodiments. As shown by FIG. 1, the optical network 12 has an optical line terminal (OLT) 15 that is optically coupled to a plurality of optical network terminals (ONTs) 21. In this regard, the OLT 15 is coupled to an optical splitter 25 by at least one optical fiber 27, and the splitter 25 is coupled to the ONTs 21 by optical fibers 32. As an example, the optical network 12 may form part of a telecommunication system where the OLT 15 is positioned at a central office of a telecommunication network or an intermediate point between the central office and a plurality of customer premises. Each ONT 21 may be positioned at or near a respective customer premises. However, other locations of the OLT 15 and ONTs 21 and other uses of the optical network 12 are possible in other embodiments.

In the downstream direction, the OLT 15 is configured to receive data to be transmitted to the ONTs 21. As an example, the OLT 15 may receive data from a network (not shown), such as the Internet or some other type of network for communicating data. The OLT 15 is further configured to encapsulate the data in accordance with the optical protocol of the network 12 and to transmit frames containing such data via at least one optical signal through the optical fiber 27 connected to the OLT 15. An optical signal carrying frames from the OLT 15 is split by the splitter 25 so that is received by each of the ONTs 21. Each ONT 21 extracts the transmitted downstream data from the received frames and transmits the data, as appropriate, further downstream, such as to customer premises equipment (CPE) (not shown) at a one more customer premises or other types of communication devices.

In the upstream direction, each ONT 21 receives data to be communicated to the OLT 15. As an example, an ONT 21 may receive data from CPE at one or more customer premises or other communication devices. The ONT 21 is further configured to encapsulate the data in accordance with the optical protocol of the network 12 and to transmit such data via at least one optical signal through the optical fiber 32 connected to the ONT 21. The optical signals transmitted by the ONTs 21 pass through the splitter 25 and the optical fiber 27 and are received by the OLT 15. The OLT 15 extracts the transmitted upstream data and transmits the data, as appropriate, further upstream, such as to a network (e.g., the Internet or other type of network).

Communication in the upstream direction is time-division multiplexed, under the control of the OLT 15, so as to prevent interference between the transmissions of the ONTs 21. In this regard, the OLT 15 may communicate with the ONTs 21 via a control channel of the optical protocol of the network 12 and assign each ONT 21 with timeslots in which to transmit in the upstream direction. In other embodiments, other techniques for communicating between the OLT 15 and ONTs 21 are possible. As an example, it is possible for the ONTs 21 to transmit in the upstream direction at different wavelengths (i.e., wavelength-division multiplexing) such that time-division multiplexing between the ONTs 21 is unnecessary.

Figure 2:
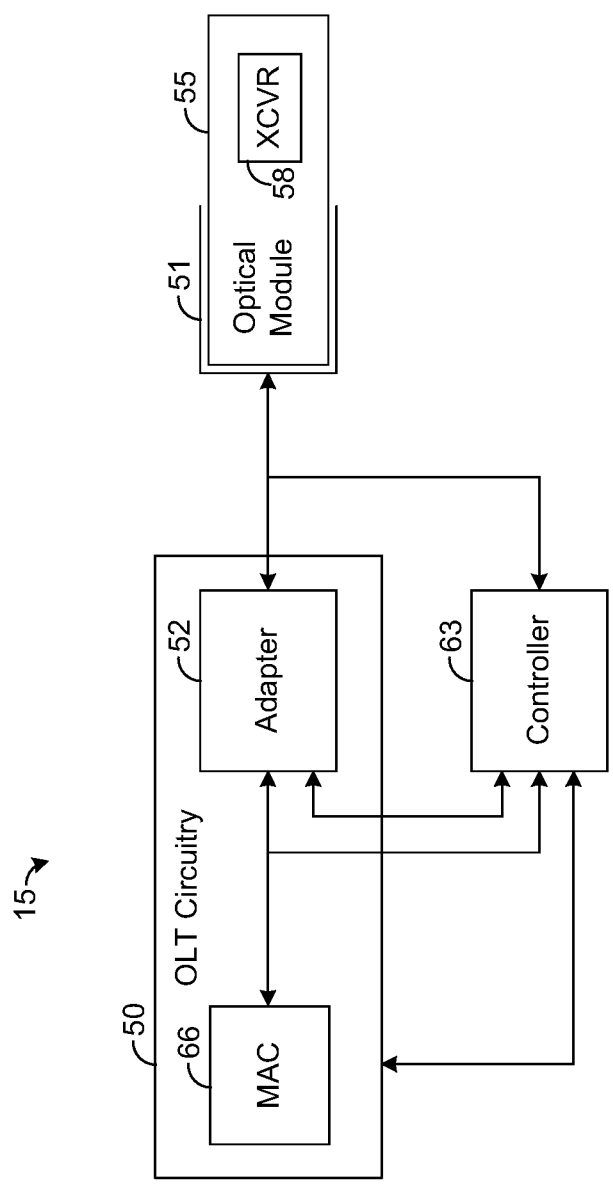
FIG. 2 is a block diagram illustrating an exemplary embodiment of an optical line terminal (OLT), such as is depicted by FIG. 1.

FIG. 2 depicts an exemplary embodiment of the OLT 15. As shown by FIG. 2, the OLT 15 comprises OLT circuitry 50 comprising an adapter 52 that is electrically connected to at least one socket 51. For illustrative purposes, the OLT 15 of FIG. 2 is shown with a single socket 51, but the OLT 15 may have any number of sockets in other embodiments. The socket 51 has a slot for receiving an optical module 55 having an optical transceiver 58. The OLT 15 also has a controller 63 that is configured to control the adapter 52, as will be described in more detail below.

The OLT circuitry 50 is configured to control the operation of the OLT 15 and the communications occurring on the optical network 12. As an example, the OLT circuitry 50 may comprise a Media Access Controller (MAC) 66 that, according to techniques known in the art, is configured to encapsulate downstream data and de-encapsulate upstream data in accordance with the optical protocol of the network 12. The MAC 66 may also communicate with the ONTs 21 to assign upstream timeslots, as described above.

The MAC 66 is configured to provide one or more electrical signals, such as one or more control signals and at least one data signal defining data to be transmitted downstream to the ONTs 21. The adapter 52 is configured to receive and process these electrical signals so that the electrical signals are compatible with the optical module 55. The optical transceiver 58 is configured to modulate an optical signal with the downstream data defined by at least one electrical signal from the adapter 52, thereby converting the downstream data from the electrical domain to the optical domain. The transceiver 58 is optically coupled to the optical fiber 27 (FIG. 1) and transmits the modulated optical signal through the optical fiber 27 to the ONTs 21.

The transceiver 58 is also configured to receive upstream optical signals from the optical fiber 27 and to recover the upstream data carried by these signals, thereby converting such data from the optical domain to the electrical domain. One or more control signals and at least one electrical signal defining such data are transmitted from the optical module 55 to the adapter 52, which forwards the upstream data to other components of the OLT circuitry 50, such as the MAC 66, for processing.

Figure 3:
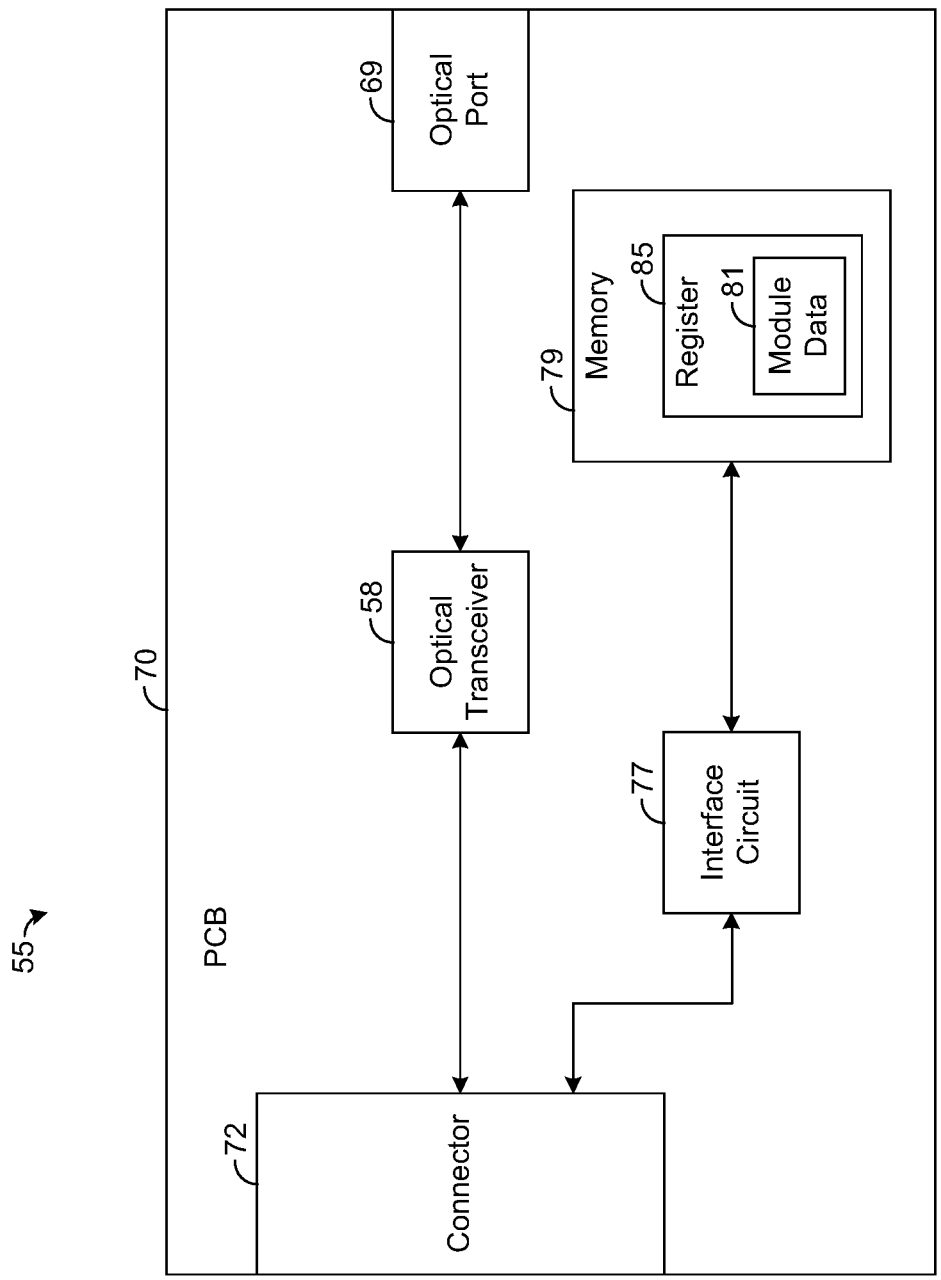
FIG. 3 is a block diagram illustrating an exemplary embodiment of an optical module, such as is depicted by FIG. 2.

As shown by FIG. 3, the optical module 55 may have a printed circuit board (PCB) 70, sometimes referred to as a "card," on which other components of the module 55 may reside. Notably, the optical module 55 is detachably coupled to the socket 51 of the OLT 15 so that it can be removed from the socket 51 by pulling the optical module 55 by hand or otherwise. In this regard, as shown by FIG. 3, the optical module 55 has an electrical connector 72 that can be plugged into or otherwise mated with the socket 51 to form an electrical connection between the optical module 55 and other components of the OLT 15, such as the adapter 52 and controller 63.

As an example, the electrical connector 72 may have a plurality of conductive pins (not shown in FIG. 3) that are respectively inserted into female receptacles of the socket 51 to mate the connector 72 with the socket 51. Each receptacle of the socket 51 may have a hole for receiving a corresponding pin of the connector 72, and an inner wall of the hole may be plated with conductive material to form an electrical connection between the pin and the receptacle.

Depending on the optical protocol employed, one or more of the pins of the connector 72 may carry an electrical signal to the adapter 52, and one or more of the pins may receive an electrical signal from the adapter 52. The specifications for the optical module 55 may indicate the type of signals to be carried by each pin and may also require certain electrical characteristics of the device that is connected to the connector 72. For example, the specifications may indicate which pin is to carry upstream data (including voltage, current, and data rate requirements) and which pin is to carry downstream data (including voltage, current, and data rate requirements). The specifications may also require one or more pins to be connected to ground or a power supply. The specifications may further require that some pins are to carry certain control signals. As an example, the specifications may indicate that one of the pins is for transmitting from the optical module 55 a "transmit fault" signal indicating whether there is a detected fault for the optical transmitter of the transceiver 58. There are many other electrical characteristics and signal types of the pins that may be required by the module's specifications in other examples.

To be electrically and operationally compatible with the optical module 55, the device connected to it must satisfy the electrical requirements of the module's specifications and also have circuits capable of processing the signals received from and transmitted to the optical module 55. Failing to adhere to the electrical requirements of the specifications or connecting a device incompatible with the electrical specifications may result in damage either to the optical module 55 or a device connected to it depending on the nature of the incompatibility.

As used herein, "electrical compatibility" refers to a device that satisfies the electrical requirements specified for a module 55, such as voltage levels and current levels. Violation of the electrical requirements may result in damage or hazardous conditions. "Operational compatibility" refers to a device that satisfies the operational requirements specified for a module 55, such as the types of signals to be communicated. As an example, an operational requirement may be that a pin is to carry a certain signal, such as a data signal or a certain control signal, whereas the electrical requirements for the pin may refer to the signal's acceptable voltage or current range. Thus, to be operationally compatible with the module 55, a device should process signals to be transmitted to or received from the module 55 such that operation of the device and module 55 is successful for communicating across the optical network 12. "Mechanical compatibility" refers to a device that is capable of physically mating with the module 55. Thus, a device that is mechanically compatible with the module 55 should have a socket 51 with a receptacle layout that corresponds to the pin layout for the connector 72 so that the connector 72 successfully mates with the socket where each pin is received by a respective receptacle.

To connect the optical module 55 with other components of the OLT 15, the optical module 55 may be inserted by hand or otherwise into a slot of the socket 51 such that the pins of the connector 72 align with the receptacles of the socket 51. As the connector 72 and socket 51 are mated, each pin of the connector 72 is received by a respective receptacle of the socket 51 and makes electrical contact with a circuit of the OLT 15. Note that there are various types of conventional connectors and sockets that may be used to electrically connect the optical module 55 with other components of the OLT 15.

As shown by FIG. 3, the optical module 55 has an optical port 69 that may be coupled to an optical fiber 27 (FIG. 1). The optical module 55 also has an interface circuit 77 and memory 79 electrically connected to the connector 72 (e.g., electrically connected to one or more pins of the connector 72) to enable a device external to the module 55, such as the controller 63 (FIG. 2), to access data 81 stored in memory 79. For illustrative purposes, this data will be referred to hereafter as "module data." In some embodiments, the module data 81 may be used to determine a type of the optical module 55, such as the optical protocol used by the optical module 55 for communication over the optical network 12. As an example, the module data 81 may include a type identifier that identifies the module type of the module 55, such as the optical protocol or combination of optical protocols supported by the module 55. In some embodiments, the module data 81 defines another type of identifier, such as a serial number (e.g., a part or model number) of the module 55, and this serial number or other identifier may be used to lookup or otherwise determine the module type.

In some embodiments, the module data 81 is stored in a register 85 that is accessible through the connector 72 via a I$^2$C protocol. In this regard, the interface circuit 77 may be compatible with I$^2$C protocol such that it responds to an I$^2$C command submitted through the connector 72 to retrieve the module data 81 from the register 85 and return the retrieved module data 81. As will be described in more detail below, the controller 63 may be configured to communicate with the interface circuit 77 to receive the module data 81 and use the module data 81 for determining a type of the optical module 55 inserted into the socket 51. In other embodiments, other techniques and protocols for accessing the module data 81 are possible.

As an example, when a user mates the optical module 55 with the socket 51, the user may manually input or otherwise send to the OLT 15 (wirelessly transmit or transmit through a data port of the OLT 15) data indicative of the type of optical module 55 mated with the socket 51. In some embodiments, the OLT 15 may have one or more switches or buttons (not shown) that may be used by a user for indicating the type of optical module 55 mated with the socket 51. Yet other techniques for enabling the controller 63 to determine the type of optical module 55 mated with the socket 51 are possible.

As noted above, the optical module 55 may implement any of a variety of optical protocols for communication over the optical network 12. As an example, the optical module 55 may utilize GPON, XGS-PON, or a combination of optical protocols, such as a combination of GPON and XGS-PON, referred to in the art as "Multi-PON." Note that, as used herein, "GPON" refers to an optical protocol in accordance with the GPON standard, including different versions of the GPON standard; "XGS-PON" refers to an optical protocol in accordance with the XGS-PON standard, including different versions of the XGS-PON standard; and Multi-PON refers to an optical protocol in accordance with the Multi-PON standard, including different versions of the Multi-PON standard. In other embodiments, the optical module 55 may utilize other types of optical protocols or combinations of optical protocols for communication across the network 12.

By detachably coupling the optical module 55 to the socket 51, as described above, it is possible to remove the optical module 55 by hand or otherwise as may be desired. For example, in the event of a fault on the optical module 55, the module 55 may be removed and replaced with a new module 55. However, if the OLT 15 is electrically incompatible with the module 55 that is mated with the socket 51, then components of the OLT 15 may be damaged or errors in the operation of the OLT 15 may occur.

Figure 4:
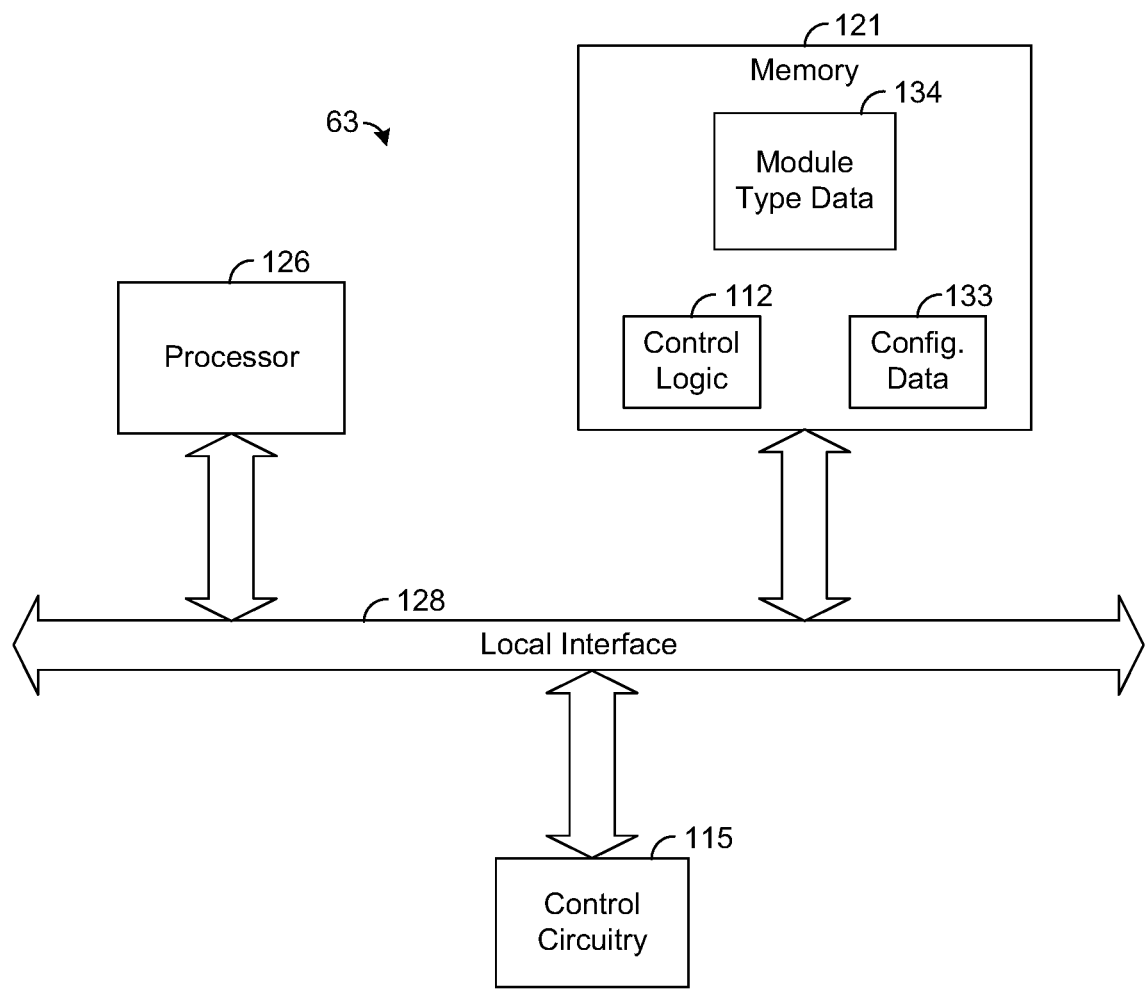
FIG. 4 is a block diagram illustrating an exemplary embodiment of controller, such as is depicted by FIG. 2.

In some embodiments, the adapter 52 is configurable to operate in different modes under the control of the controller 63 so that it operates in a compatible manner with the optical module 55 that is inserted into the socket 51, as will be described in more detail below. FIG. 4 depicts an exemplary embodiment of the controller 63.

As shown by FIG. 4, the controller 63 comprises control logic 112 and control circuitry 115 for generally controlling the operation of the controller 63, as will be described in more detail hereafter. The control circuitry 115 is implemented in hardware, such as a field programmable gate array (FPGA), for example. The control logic 112 can be implemented in software, hardware, firmware or any combination thereof. In the exemplary controller 63 illustrated by FIG. 4, the control logic 112 is implemented in software and stored in memory 121 of the controller 63.

Note that the control logic 112, when implemented in software, can be stored and transported on any computer-readable medium for use by or in connection with an instruction execution apparatus that can fetch and execute instructions. In the context of this document, a "computer-readable medium" can be any means that can contain or store a computer program for use by or in connection with an instruction execution apparatus.

The exemplary controller 63 depicted by FIG. 4 comprises at least one conventional processor 126, such as a digital signal processor (DSP) or a central processing unit (CPU), that communicates to and drives the other elements within the controller 63 via a local interface 128, which can include at least one bus and at least one control signal. The local interface 128 may be electrically connected to the OLT circuitry 50 (FIG. 2), including in particular the adapter 52, and socket 51 to enable communication with these components, as well as the interface circuit 77 (FIG. 3).

As shown by FIG. 4, the memory 121 stores configuration data 133 and module type data 134 that are used by the control logic 112 and/or the control circuitry 115 for controlling the adapter 52 (FIG. 2). As will be described in more detail below, the module type data 134 includes information that enables the module type for the module 55 to be identified based on the module data 81 (FIG. 3). As an example, the module type data 134 may define a table that correlates an identifier from the module data 81 with a type identifier indicative of a module type of the module 55.

The configuration data 133 indicates how the adapter 52 is to be configured or otherwise controlled by the controller 63 in order to place the adapter 52 in the desired mode of operation, as will be described in more detail hereafter. In this regard, based on the configuration data 133, the controller 63 may transmit to the adapter 52 control signals for controlling the components of the adapter 52, and the configuration data 133 may indicate the states of the control signals so that the adapter 52 operates in the desired mode. As an example, the control signals may be used to turn on or off certain transistors, or the control signals may be transmitted to multiplexers or switches to control the switching functionality of these components (e.g., control which input is selected for output by a multiplexer or whether a switch is in an open state or a closed state).

In some embodiments, the controller 63 is configured to selectively control the adapter 52 to work in a plurality of modes of operation where each mode of operation corresponds to a specific optical protocol or combination of optical protocols. Further, when the adapter 52 is placed in a given mode of operation, the controller 63 controls the adapter 52 so that it is electrically and operationally compatible with a module that supports the optical protocol or combination of optical protocols corresponding to the mode of operation.

As an example, one of the modes of operation may correspond to GPON and another mode of operation may correspond to XGS-PON. When an optical module 55 of a type that communicates in accordance with GPON is inserted into the socket 51, the controller 63 controls the adapter 52 so that it is electrically and operationally compatible with such optical module 55. That is, the electrical and operational characteristics of the adapter 52 are controlled so that these characteristics meet the electrical and operational specifications for interfacing with a GPON module.

However, when an optical module 55 of a type that communicates in accordance with XGS-PON is inserted into the socket 51, the controller 63 controls the adapter 52 so that it is electrically and operationally compatible with such optical module 55. That is, the electrical and operational characteristics of the adapter 52 are controlled so that these characteristics meet the electrical and operational specifications for interfacing with an XGS-PON module.

Note that that the controller 63 can be configured to control the adapter 52 to be suitable for use in conjunction with any desired module type. As an example, in addition to supporting GPON and XGS-PON, the controller 63 may be configured to control the adapter 52 to be suitable for use with a Multi-PON module. Yet other types of optical modules 55 supporting other optical protocols or combinations of protocols in addition to or in lieu of the optical protocols specifically described herein may be supported in other embodiments.

Note that the controller 63 is shown in FIG. 2 as separate from the OLT circuitry 50, including the MAC 66 and the adapter 52. However, it should be emphasized that the controller 63 may form part of the circuitry implemented within the OLT 15 and, in fact, may be integrated with and/or share hardware (e.g., memory, processors, etc.) with components of the OLT circuitry 50 shown by FIG. 2, including components of the adapter 52 and/or the MAC 66. As an example, in some embodiments, the controller 63 or at least portions of the controller 63 may be implemented in an FPGA structure along with at least portions of the OLT circuitry 50 shown by FIG. 2, including at least portions of the MAC 66 and/or the adapter 52. In other embodiments, other configurations and techniques for implementing the OLT circuitry 50 shown by FIG. 2 and the controller 63 are possible.

In addition to the modes corresponding to optical protocols described herein, the controller 63 may be configured to control the adapter 52 to work in a mode, referred to herein as the "safe mode." In the safe mode, the controller 63 controls the adapter 52 so that it is electrically compatible with any module type supported by the OLT 15 for preventing circuit damage or unsafe operating conditions. In such mode, the adapter 52 is mechanically and electrically compatible with each type of supported module 55 but might not be operationally compatible with any such type of module 55. That is, in the safe mode, the adapter 52 is electrically compatible with any module of a type that is supported by the OLT 15 but successful operation for communicating across the optical network 12 may not occur until the adapter 52 is transitioned out of the safe mode and into a mode that is operationally compatible with the module 55, as will be described in more detail below. As a mere example, in the safe mode, the adapter 52 might electrically disconnect a given receptacle so as to prevent circuit damage irrespective of which module type is mated with the socket 51, but in another mode of operation, the adapter 52 might electrically connect the same receptacle to a circuit for transmitting a control signal to an optical module 55 mated with the socket 51 depending on the operational requirements of such module 55.

To illustrate the foregoing in more detail assume that, for a particular pin of the connector 72 (FIG. 3), the specifications for a given optical module 55 specify a certain signal type. For example, the specifications may specify that the pin is to carry a control signal for indicating a certain condition. In the safe mode, the adapter 52 might not be configured to control the signal transmitted to such pin for indicating the condition, but the pin would be connected to a circuit of the adapter 52 that satisfies the electrical requirements for the pin, such as the maximum voltage or current, for example. Thus, while in the safe mode, the adapter 52 does not satisfy the signal type requirement for the pin but does satisfy the pin's electrical requirements for preventing circuit damage or unsafe operating conditions in the OLT 15. That is, in the safe mode, the adapter 52 is electrically compatible with the pin but not operationally compatible since it is not configured to transmit the specified signal type to the pin.

The safe mode may be used, for example, when there is no optical module 55 mated with the socket 51 to help ensure that damage or hazardous conditions do not occur when an optical module 55 is inserted into the socket 51. In this regard, there may be a finite amount of time that elapses between the time that an optical module 55 is inserted into the socket 51 and the time that the adapter 52 transitions into the operational mode corresponding to the module's type, as will be described in more detail below. If the adapter 52 is in the safe mode before the optical module 55 is mated with the socket 51, then operation of the adapter 52 in the safe mode prevents damage or unsafe operating conditions after insertion of the module 55 but prior to successful transition of the adapter 52 into the appropriate mode (i.e., the mode corresponding to the module's type) regardless of the type of optical module 55 that is inserted into the socket 51. In some embodiments, depending on the types of optical modules 55 supported, the controller 63 may configure the adapter 52 for safe mode upon power up or reboot initialization.

The safe mode may also be used when the optical module 55 inserted into the socket 51 is of a type that is not supported by the OLT 15 or is unrecognizable. In the safe mode, the adapter 52 may be configured to source to the optical module 55 or sink from the optical module 55 only a small amount of current (such as about 20 mill-Amperes or less) so that damage to the optical module 55 and the OLT 15 is prevented.

To enable the controller 63 to determine which operational mode is appropriate, the control circuitry 115 may be configured to detect when an optical module 55 is electrically mated with the socket 51, as will be described in more detail below. In some embodiments, the control circuitry 115 checks for a presence of an optical module 55 in the socket 51 frequently, such as every 50 milliseconds (ms), for example, so that the adapter 52 is quickly transitioned to the safe made when an optical module 55 is removed from the socket 51. This helps to reduce the likelihood that another optical module 55 will be inserted into the socket 51 before the adapter 52 is transitioned to the safe mode.

When the control circuitry 115 determines that an optical module 55 has been inserted into and electrically mated with the socket 51, the control circuitry 115 is configured to communicate with the optical module 55 to determine information indicative of the type of module 55 that is mated with the socket 51. As an example, the control circuitry 115 may receive from the optical module 55 an identifier that identifies the module type or other information, such as a model or part number that may be used to identify the type of optical module 55 mated with the socket 51.

Note that there are various techniques and protocols that may be used by the control circuitry 115 to detect an optical module 55 and determine information indicative of module type. In some embodiments, the control circuitry 115 is configured to communicate with the optical module 55 in accordance with $I^2C$ protocol. In this regard, periodically (such as every 50 ms or some other time period), the control circuitry 115 is configured to transmit through the connector 72 (FIG. 3) to the interface circuit 77 an $I^2C$ request to read an $I^2C$ register 85 of the optical module 55. If no optical module 55 is in the socket 51, then the control circuitry 115 will not receive a valid value in response to the read request. In such case, the control circuitry 115 determines that an optical module 55 is not inserted into the socket 51 and ensures that the adapter 52 is in the safe mode.

However, if an optical module 55 is electrically mated with the socket 51, then the interface circuit 77 (FIG. 3) in response to the read request from the control circuitry 115 retrieves the module data 81 stored in the $I^2C$ register 85 and returns the module data 81 to the control circuitry 115 in an $I^2C$ reply. In such case the control circuitry 115, based on receiving valid module data 81, determines that an optical module 55 is mated with the socket 51 and forwards the module data 81 to the control logic 112 for further processing.

Based on the received module data 81, the control logic 112 is configured to determine the type of module inserted into the socket 51 and then control the adapter 52 to place it in the mode corresponding to the module type. Note that there are various techniques that can be used to select the operational mode for the adapter 52 based on module type. In some embodiments, the module data 81 defines a part or model identifier of the optical module 55 and the module type data 134 defines a table that maps each part or model identifier to an identifier of the module type to be used in selecting the mode of operation. Thus, the control logic 112 may use the part or model identifier from the module data 81 as a key to look up the module's type and then select, based on module type, the operational mode for the adapter 52 so that it is electrically and operationally compatible with the optical module 55. The control logic 112 then causes the controller 63 to send to the adapter 52 control signals for transitioning the adapter 52 to such mode, as will be described in more detail below.

Thus, when an optical module 55 is inserted into and electrically mated with the socket 51, the adapter 52 should be operating in the safe mode, and the presence of the optical module 55 is detected by the control circuitry 115. The control logic 112 then controls the adapter 52 to transition it from the safe mode to an operational mode that is electrically and operationally compatible with the optical module 55. In this regard, as will be described in more detail below, the configuration data 133 may indicate how the adapter 52 is to be controlled (e.g., specify the types of control signals to be transmitted to the adapter 52) for placing the adapter 52 in the desired mode of operation. Once transitioned to the desired mode of operation, the adapter 52 should remain in this operational mode until the optical module 55 is pulled from the socket 51 at which point the control circuitry 115 quickly detects removal of the module 55 from the socket 51 and transitions the adapter 52 to the safe mode.

Note that using the control circuitry 115 to detect the presence of an optical module 55 and transition the adapter 52 to the safe mode when the module is removed from the socket 51 helps to ensure that the adapter 52 is quickly transitioned to the safe mode, when appropriate, since the control circuitry 115 is implemented in hardware (e.g., an FPGA). Further, using software to select the desired mode of operation for an optical module 55 may have several advantages such as facilitating processing of a large amount of data and facilitating updates to the configuration data 133 and the module type data 134. As an example, the configuration data 133 may be updated to change the manner in which the adapter 52 is to be controlled for a given mode of operation (including possibly adding additional modes of operation).

In addition, the selection of a mode of operation and transition of the adapter 52 to the selected mode of operation by the control logic 112 after insertion of a module 55 into the socket 51 is not generally as time sensitive as the transitioning of the adapter 52 to the safe mode performed by the control circuitry 115 when the module 55 is removed from the socket 51. Thus, using hardware to perform the functions described herein for the control circuitry 115 and software to perform the functions described herein for the control logic 112 has various advantages, but performing the ascribed functions in this manner is unnecessary in other embodiments. Indeed, it is possible for any of the functions described herein as being performed by the control logic 112 to be performed by the control circuitry 115, and it is possible for any of the functions described herein as being performed by the control circuitry 115 to be performed by the control logic 112.

Further, there are various techniques that may be used by the controller 63 to control the adapter 52 as described herein. In this regard, as indicated above, the control signals from the controller 63 may be transmitted to and control components of the adapter 52, such as to turn on or off certain transistors or control the states of switches, multiplexers, or other types of circuitry of the adapter 52. To better illustrate some of these concepts, exemplary techniques for controlling components of the adapter 52 will be described in more detail below with reference to FIGS. 5-9. However, it should be emphasized that the techniques described below are presented for illustrative purposes, and other techniques are possible in other embodiments.

Figure 5:
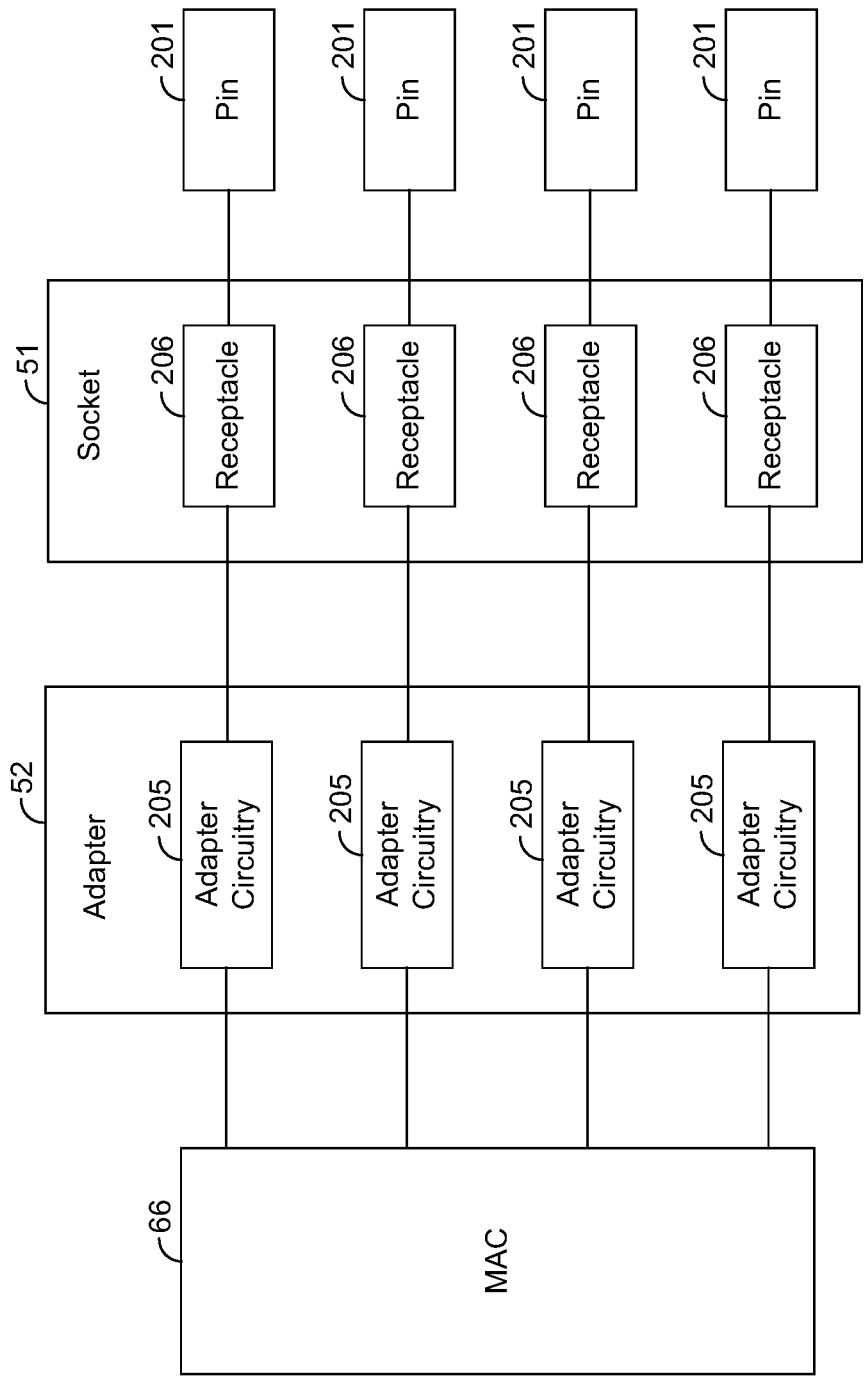
FIG. 5 is a block diagram illustrating an exemplary embodiment of OLT circuitry, such as is depicted by FIG. 2, connected to a plurality of pins of an optical module.

FIG. 5 shows a plurality of pins 201 of the connecter 72 (FIG. 3) for an optical module 55 that is electrically mated with the socket 51. As shown by FIG. 5, each pin 201 is electrically connected to respective adapter circuitry 205 of the adapter 52 through a respective receptacle 206 into which the pin 201 is inserted. Each set of adapter circuitry 205 may be electrically connected to circuitry (not shown in FIG. 5) of the optical module 55 through a respective pin 201 and receptacle 206 pair and may also be electrically connected to other components of the OLT circuitry 50, such as the MAC 66. The adapter circuitry 205 may receive and process an electrical signal from either another component of the OLT circuitry 50 (e.g., the MAC 66) or the optical module 55 and may transmit a processed electrical signal to either another component of the OLT circuitry 50 (e.g., the MAC 66) or the optical module 55 depending on the type of module 55 mated with the adapter 52.

Figure 6:
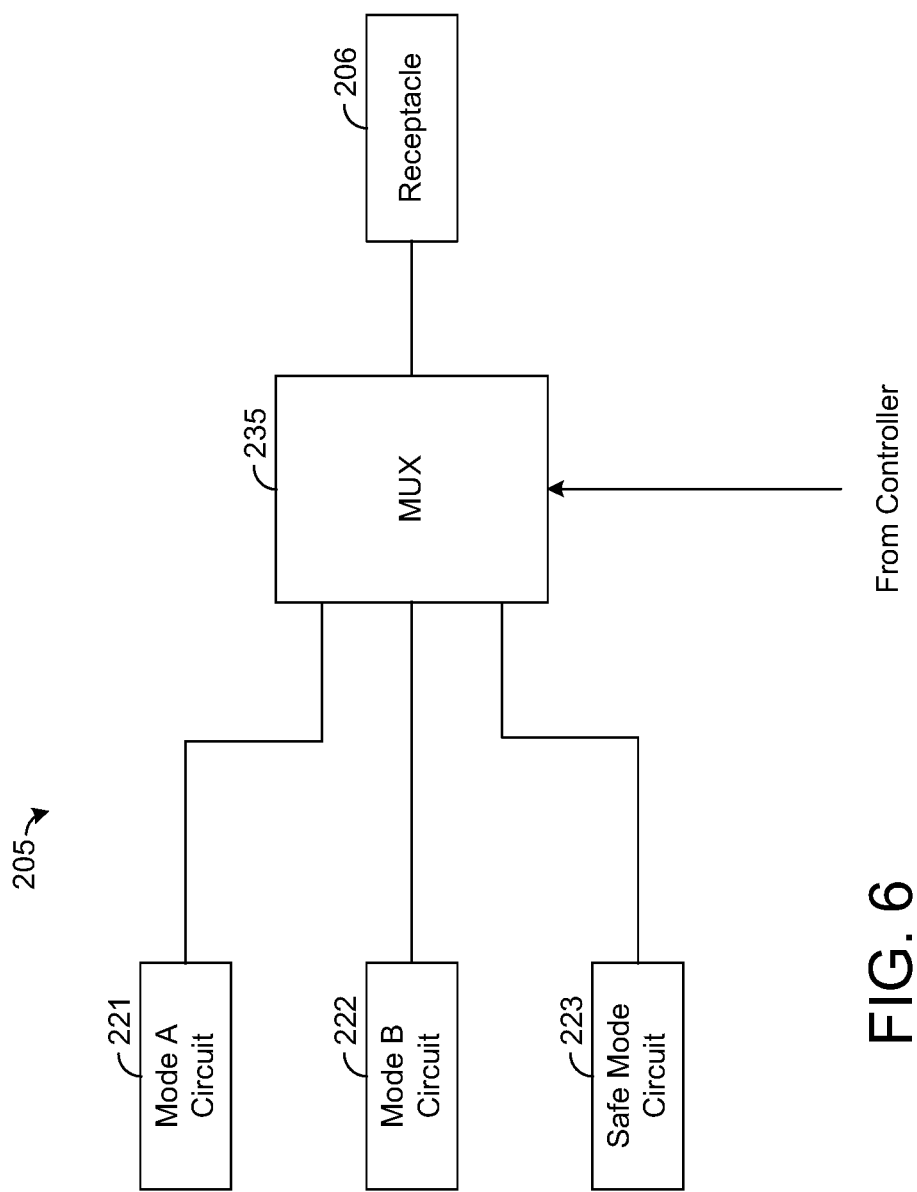
FIG. 6 is a block diagram illustrating an exemplary embodiment of adapter circuitry, such as is depicted by FIG. 5.

FIG. 6 depicts an exemplary embodiment of adapter circuitry 205. In the exemplary embodiment depicted by FIG. 6, the adapter circuitry 205 comprises a plurality of circuits 221-223, referred to herein as "Mode A circuit," "Mode B circuit," and "Safe Mode circuit." The Mode A circuit 221 is electrically and operationally compatible with a first type of optical module 55, such as a GPON module for example, for operation in a first mode. The Mode B circuit 222 is electrically and operationally compatible with a second type of optical module 55, such as XGS-PON for example, for operation in a second mode. Further, the Safe Mode circuit 223 is electrically but not operationally compatible with both types of optical modules 55 for operation in the safe mode. In other embodiments, the Safe Mode circuit 223 is not needed, depending on the type of optical modules 55 that are supported. In other embodiments, any number of circuits compatible with any number of optical module types may be connected to the multiplexer 235 and selectively connected to the receptacle 206 (and thus the pin 201 of the connector 72 inserted into the receptacle 206) by the multiplexer 235, as described in more detail below.

Each of the circuits 221-223 is electrically connected to the multiplexer 235, which receives a control signal from the controller 63. When an optical module 55 is inserted into the socket 51, as shown by FIG. 2, the multiplexer 235 selectively couples one of the circuits 221-223 to the receptacle 206 based on the control signal from the controller 63. As described above, at the time that the optical module 55 is inserted into the socket 51, the controller 63 should be controlling the multiplexer 235 such that it electrically couples the Safe Mode circuit 223 to the receptacle 206 and electrically isolates the Mode A circuit 221 and the Mode B circuit 222 from the receptacle 206. After detecting the presence of the optical module 55 in the socket 51, the controller 63 may control the multiplexer 235 such that it electrically couples one of the circuits 221 or 222 to the receptacle 206.

As an example, if the optical module 55 is of a type corresponding to the Mode A circuit 221, the controller 63 may control the multiplexer 235 such that it electrically couples the Mode A circuit 221 to the receptacle 206 and electrically isolates the Mode B circuit 222 and the Safe Mode circuit 223 from the receptacle 206. If the optical module 55 is instead of a type that corresponds to the Mode B circuit 222, then the multiplexer 235 may be controlled to electrically couple the Mode B circuit 222 to the receptacle 206 and electrically isolate the Mode A circuit 221 and the Safe Mode circuit 221 from the receptacle 206. Thus, the circuit 221 or 222 electrically and operationally compatible with the optical module 55 should be electrically connected to the receptacle 206 once the optical module 55 is mated with the socket 51 and detected by the controller 63.

Note that the configuration of the adapter circuitry 205 connected to the pin 201 may be more complex than the exemplary circuitry shown by FIG. 6. As an example, it is possible for the circuits 221-223 and the multiplexer 235 to share electrical components and devices as may be desired. Regardless of the actual configuration of the circuits 221-223, when the controller 63 detects an optical module 55 of a certain type in the socket 51, the controller 63 controls the multiplexer 235 and possibly other components and devices of the adapter circuitry 205 connected to a receptacle 206 such that the adapter circuitry is compatible with the operational and electrical requirements for the pin 201 inserted into that receptacle 206, as specified by the applicable specifications for the type of optical module 55 inserted into the socket 51.

In some embodiments, to meet the electrical and operational requirements of different types of optical modules 55, it may be desirable for the adapter 52 to provide a low resistance connection to ground for a particular pin 201 of the module's connector 72 if a first type of optical module 55 is inserted into the socket 51 but to carry and process a control signal if a second type of optical module 55 is inserted into the socket 51. As an example, when the first type of optical module 55 is in the socket 51, the optical module 55 may connect the pin 201 to the ground plane of the module 55 such that the ground plane of the module 55 and the ground plane of the adapter 52 are electrically connected to each other through the pin 201 and the corresponding receptacle 206. It is generally desirable for these two ground planes, or their functionally equivalent ground networks, to be at the same voltage potential and, thus, for the resistance in the path between the ground planes to be as low as possible. However, when an optical module 55 of the second type is instead inserted into the socket 51, it may be desirable for the circuit of the adapter 52 connected to the corresponding pin 201 inserted into the same receptacle 206 to transmit or receive a control or data signal.

Figure 7:
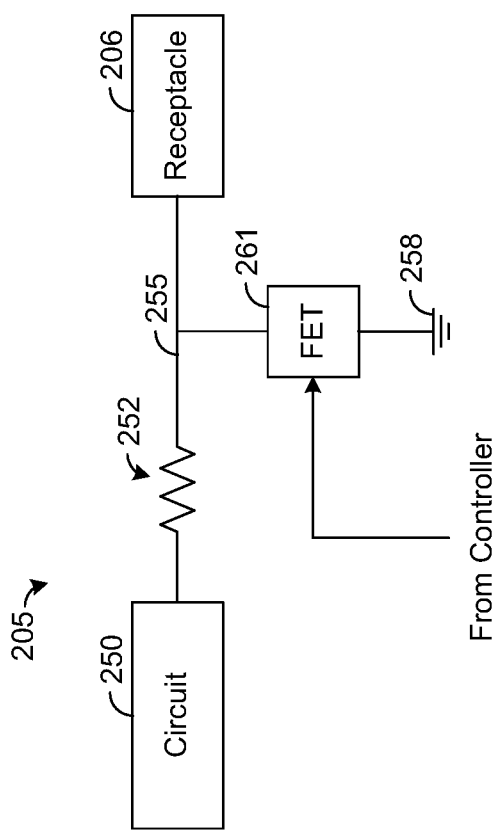
FIG. 7 is a block diagram illustrating an exemplary embodiment of adapter circuitry, such as is depicted by FIG. 5.

FIG. 7 depicts an exemplary embodiment of adapter circuitry 205 that may be used to achieve the functionality described above. In this regard, the adapter 52 comprises a circuit 250 that is electrically connected through a resistor 252 to a receptacle 206 for a particular pin position of the connector 72 of an optical module 55 mated with the socket 51. The node 255 between the resistor 252 and the receptacle 206 is connected to ground 258 of the adapter 52 through a field-effect transistor 261. When an optical module 55 of a first type (e.g., a Multi-PON module) is mated with the socket 51, a control signal may be communicated between the circuit 250 and optical module 55 through the receptacle 206 and pin 201 (not shown in FIG. 7) inserted into the receptacle 206. However, when an optical module 55 of a second type (e.g., GPON or XGS-PON module) is inserted into the socket 51, the receptacle 206 may be electrically connected to ground 258. In the embodiment shown by FIG.

7, the field-effect transistor 261 may be used to control in which mode the adapter 52 operates for the receptacle 206.

In this regard, the gate of the field-effect transistor 261 may be electrically connected to the controller 63 and receive a control signal from the controller 63 for controlling whether the field-effect transistor 261 is turned on. As an example, if the controller 63 determines that an optical module 55 of the first type (e.g., a Multi-PON module) is mated with the socket 51, the controller 63 may be configured to turn off the field-effect transistor 261 such that the field-effect transistor 261 electrically isolates ground 258 from the node 255 and thus the receptacle 206, thereby enabling the circuit 250 to communicate with the optical module 55 through the receptacle 206. However, if the controller 63 determines that an optical module 55 of the second type (e.g., a GPON or XGS-PON module) is mated with the socket 51, the controller 63 may be configured to turn on the field-effect transistor 261 such that the field-effect transistor 261 electrically connects ground 258 to the node 255 and thus the receptacle 206.

In safe mode, the controller 63 may be configured to turn off the field-effect transistor 261 such that the field-effect transistor 261 electrically isolates ground 258 from the node 255.

In another embodiment, the field-effect transistor 261 may be used to switch a control signal. In this case, the resistor 252 acts as a pull-up resistor, the circuit 250 is simply a connection to the proper power supply voltage, and the field-effect transistor 261 acts as an inverting buffer. In this regard, a logical high signal from the controller 63 applied to the gate of the field-effect transistor 261 turns on the field-effect transistor 261 and pulls node 255 to a logical low level (e.g., ground). Conversely, a logical low signal from the controller 63 applied to the gate of field-effect transistor 261 turns off field-effect transistor 261 and node 255 is pulled-up to a logical high level (e.g., the power supply voltage) by resistor 252. The field-effect transistor 261 must turn on and off sufficiently fast to meet the electrical specifications of the optical module 55.

Also, this embodiment may implement a level-shifter function, where the power supply voltage provided by circuit 250 through resistor 252 is electrically compatible with the optical module 55. In this regard, the controller 63 (FIG. 2) may be configured to control the adapter 52 such that a data signal (e.g., a signal modulated with data that transitions between a logical low value and logical high value in order to convey binary data values) is received by the gate of the field-effect transistor 261. When the data signal is at a logical high value, the field-effect transistor 261 is turned on such that the node 255 and, thus, receptacle 206 are electrically connected to ground 258 through the field-effect transistor 261, thereby providing a logical low signal for the optical module 55. When the data signal is at a logical low value, the field-effect transistor 261 is turned off such that the node 255 and, thus, receptacle 206 are electrically isolated from ground 258 by the field-effect transistor 261. In such case, the signal transmitted by the circuit 250 passes through the receptacle 206 to the optical module 55 mated with the socket 51, and such signal may have a voltage and current compatible with the optical module 55. Notably, the voltage and/or current of the signal transmitted by the circuit 250 through resistor 252 may be different than the voltage and current of the data signal received by the gate of the field-effect transistor 261. Thus, the circuit shown by FIG. 7 may perform a level-shifter function where the voltage or current of the data signal is effectively shifted to a different level that is compatible with the specifications of the optical module 55.

In another embodiment, when an optical module 55 of a certain type (e.g., a Multi-PON module) is mated with the socket 51, a control signal may be communicated from the optical module 55 through the receptacle 206 and through the resistor 252 to the circuit 250. In this regard, the field-effect transistor 261 may be controlled to be off, thus electrically isolating ground 258 from the node 255 and thus the receptacle 206, thereby enabling the optical module 55 to communicate with the circuit 250. In this embodiment, the resistor 252 may be about zero ohms, though other resistance values are possible.

In some embodiments, the field-effect transistor 261 preferably has a low on-resistance and capacitance. As an example, the transistor's on-resistance, $Q_{gs}$ (i.e., the gate to source charge required to turn on the field-effect transistor 261) and $C_{oss}$ (i.e., the drain output capacitance) may be less than 1 Ohm, 1 Nano Coulombs and 50 Pico Farads, respectively. In one embodiment, the field-effect transistor 261 may be a DMG2302 N-channel enhancement mode MOSFET sold by Diodes, Inc. having an on-resistance of about 0.1 Ohm, a $Q_{gs}$ of about 0.1 Nano Coulombs and a $C_{oss}$ of about 30 Pico Farads, though other field-effect transistors may be used in other embodiments. The field-effect transistor 261 provides very low on-resistance for coupling together the ground planes of adapter 52 and the optical module 55 for at least one operational mode, low $Q_{gs}$ for fast switching when used as an inverting buffer for accommodating a control signal communicated by the circuit 250 for at least one other operational mode, and low $C_{oss}$ capacitive loading of node 255 for fast switching by circuit 250 for at least one other operational mode In other embodiments, other circuit configurations may be used to achieve similar functionality. As an example, it is possible to replace the field-effect transistor 261 of FIG. 7 with a single-pole, single-throw (SPST), radio-frequency (RF) relay (not shown) to provide a low resistance connection to ground. However, such a relay may have greater cost, greater size and inferior switching performance relative to the field-effect transistor 261. Yet other circuit configurations are possible in other embodiments.

In some embodiments, it is possible for the circuit 250 to process a high-speed data signal (e.g., greater than about 800 Megabits per second (Mbps)) that is transmitted to or received from an optical module 55 through the receptacle 206 for a given pin position. However, use of a field-effect transistor (FET), such as the field-effect transistor 261 shown by FIG. 7, would likely impair the data signal at such a high rate of speed. Also, use of a series resistor, such as resistor 252 shown in FIG. 7, would likely impair the data signal also. Alternatively, a single-pole, double-throw (SPDT) RF relay could be used in place of the field-effect transistor 261 to multiplex the high-speed data signal and ground, but such a relay can be relatively large and expensive. An analog switch could be used to multiplex the high-speed data signal and ground, but such a switch undesirably has a relatively high on-resistance making it undesirable for grounding the receptacle 206 and thus pin 201.

Figure 8:
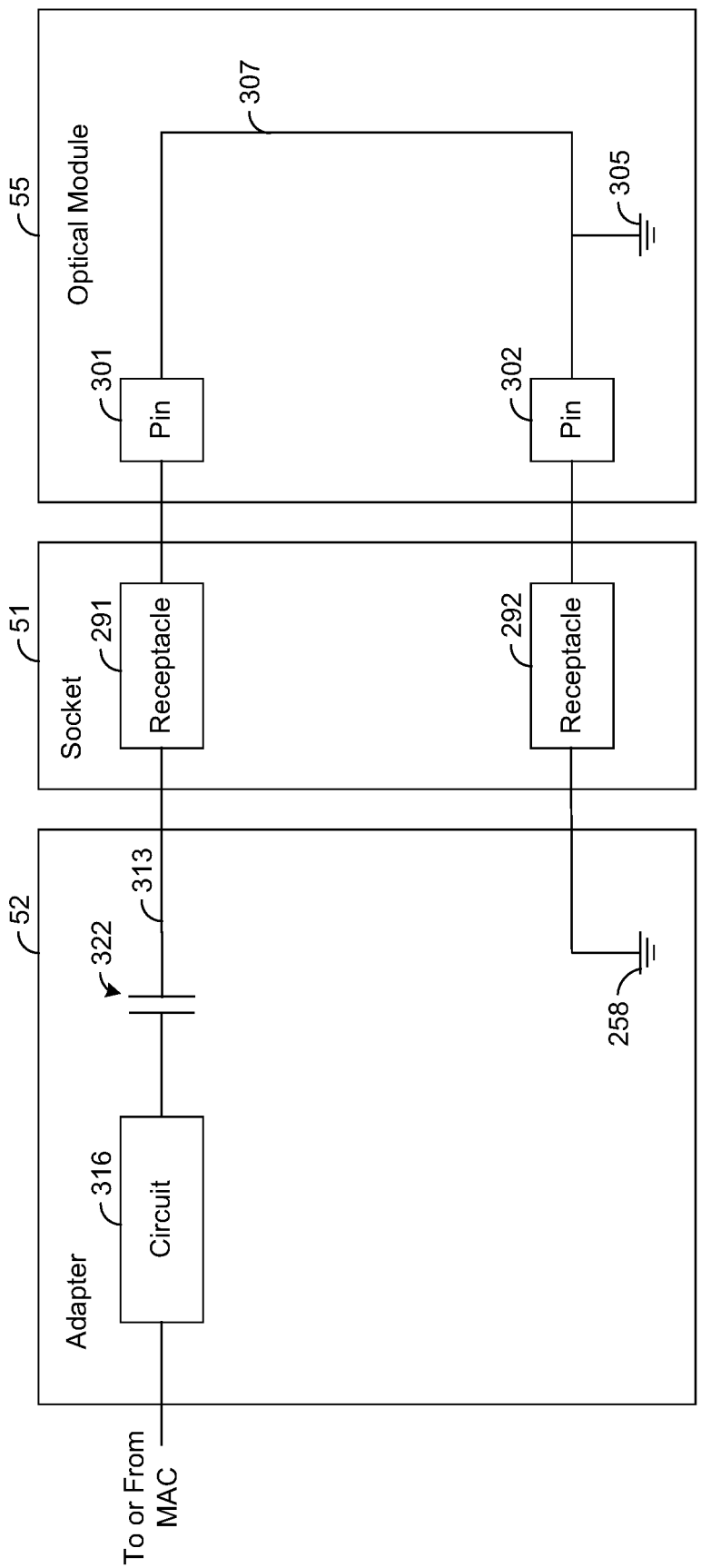
FIG. 8 is a block diagram illustrating an exemplary embodiment of OLT circuitry mated with an optical module, such as is depicted by FIG. 2.

Another embodiment of adapter circuit 205 in FIG. 5 that is suitable for a high-speed data signal is shown in FIG. 8. Circuit 316 is electrically connected to receptacle 291 through capacitor 322. The use of a capacitor, such as capacitor 322, is well known in the art and is selected such that it does not significantly impair the high-speed data signal. Capacitor 322 is often a requirement specified by some types of optical modules 55 to provide DC isolation between the circuit 316 and module 55. Even when not a requirement of the optical module 55, the capacitor 322 is useful for another type of DC isolation, as described in more detail below.

In this regard, as described above and referring to FIGS. 5 and 7, some specifications for a type of optical module 55 may require a pin 201 and, thus, the receptacle 206 receiving the pin 201 to be grounded (i.e., electrically connected to ground 258 of the adapter 52). As an example, the specifications for a Multi-PON module 55 may require the pins 201 at two particular pin positions (e.g., "Pin 1" and "Pin 10") to carry high-speed data signals, and the specifications for both GPON and XGS-PON modules require the pins 201 at these same pin positions (i.e., "Pin 1" and "Pin 10") to be grounded.

Figure 9:
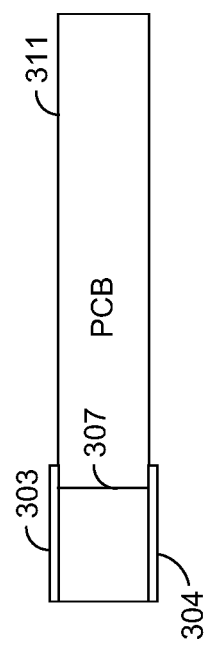
FIG. 9 is a block diagram illustrating an exemplary embodiment of printed circuit board of the optical module depicted by FIG. 8.

However, through inspection of GPON and XGS-PON modules 55 in detail, it has been determined that the pins 201 at the aforementioned pin positions to be grounded are typically connected electrically to at least one other ground pin of the module 55, as is shown by FIG. 8. In this regard, the optical module 55 shown by FIG. 8 has a pair of ground pins 301 and 302 for insertion into socket receptacles 291 and 292, respectively. The pins 301 and 302 are electrically connected to ground 305 of the module 55 and to each other by a conductive via 307. In this regard, the pin 301 is electrically connected to a conductive finger 303 residing on one surface (e.g. top surface) of a printed circuit board (PCB) 311, and the pin 302 is electrically connected to a conductive finger 304 residing on an opposite surface (e.g., bottom surface) of the PCB 311, as shown by FIG. 9. Further, the pins 301 and 302 may be electrically connected to each other by the via 307 that extends through the PCB 311 from the finger 303 on the top surface to the finger 304 on the bottom surface.

Notably, as described above, the specifications for at least one module type (e.g., GPON and XGS-PON) require the pin 301 to be grounded, but the specifications for at least one other module type (e.g., Multi-PON) specify that the pin at this same pin-position (i.e., the pin for insertion into the receptacle 291) is to carry a high-speed data signal, such as greater than 1 Gbps (e.g., about 10 Gbps).

However, it is preferable for the node 313 of the adapter 52 that is between the receptacle 291 and the capacitor 322 of the adapter 52 not be connected to the adapter's ground 258 by the methods previously described, due to impairment of the high-speed data signal or due to cost or size. Therefore, the electrical connection of the pin 301 of optical module 55 to ground 258 of adapter 52 does not pass through receptacle 291, but instead passes through the ground plane of the optical module 55 and, in particular, through via 307, pin 302 and receptacle 292. Not having the receptacle 291 and thus pin 301 directly connected to ground 258 by circuit components of the adapter 52 generally increases the resistance between the ground planes of the adapter 52 and the optical module 55. However, the increase in resistance is relatively small. Also, the increase in inductance between the ground planes is relatively small, since fingers 303 and 304 (FIG. 9) are tightly coupled. Indeed, testing has shown that significant degradation in performance of a GPON or XGS-PON module 55 does not result from the circuit configuration shown by FIG. 8.

In FIG. 8, the circuit 316 may be configured to process a high-speed data signal to be transmitted to a different type of optical module 55, such as a Multi-PON module for example. Such a circuit 316 is not operationally used when the adapter 52 is interfaced with the optical module 55 depicted by FIG. 8. However, since node 313 is electrically connected to ground 305 in the module 55 depicted by FIG. 8, care should be taken to prevent further damage to the circuit 316 when the adapter 52 is mated with this type of optical module 55 of FIG. 8. In the embodiment shown by FIG. 8, the circuit 316 is connected to the node 313 through a capacitor 322, which provides DC isolation between circuit 316 and node 313, and thus the ground 305 of module 55. Also, controller 63 disables the circuit 316 from switching when an optical module 55 that grounds node 313 is plugged in, preventing damage to circuit 316 due to excessive transient current flow through the capacitor 322 and into ground. Switching of the circuit 316 is also disabled by the controller 63 when in safe mode. As noted previously, the presence of the capacitor 322 should not significantly degrade the high-speed data signal communicated by the circuit 316 when the adapter 52 is interfaced with another type of optical module, such as Multi-PON. Thus, the configuration shown by FIG. 8 is electrically compatible with specifications for one type of optical module 55 specifying the pin 301 to be grounded and also with specifications for another type of module specifying the pin at the same pin position (i.e., the pin inserted into receptacle 291) to carry a high-speed data signal.

There are various other techniques that can be used to make the adapter 52 electrically and operationally compatible across several different types of optical modules 55. As an example, in some cases, the adapter 52 may implement different functions for the same pin position depending on the type of module 55 inserted into the socket 51. In other cases, the adapter 52 may process a signal from a given pin position in one mode but ignore a signal from the same pin position in a different mode. As an example, in one mode of operation when an optical module 55 of a first type is mated with the socket 51, the optical module 55 may transmit a data signal through a pin at a particular pin position of the connector 72, and a circuit of the adapter 52 may process the data signal. However, in a different mode of operation when an optical module of a second type is mated with the socket 51, the optical module 55 may transmit a control signal through a pin at the same pin position. For example, the control signal might be a "transmit fault" signal indicating whether there is a transmission fault with the optical transmitter of the transceiver 58. In the safe mode, the adapter 52 may be controlled by the controller 63 such that it ignores such control signal without violating the specifications for the optical module 55.

In addition, in some cases, the specifications of different module types may require different voltage levels for the same pin position. Thus, in one mode, the adapter 52 may be controlled to transmit or receive a signal in a first voltage range to or from a pin at a particular pin position, and in a different mode, the adapter 52 may be controlled to transmit or receive a signal in a different voltage range to or from a pin at the same pin position. In such case, the adapter 52 may have a circuit, referred to as a "level shifter" for selectively adjusting a voltage level of a signal to be transmitted to or received from the particular pin position, depending on the type of optical module 55 inserted into the socket 51. Exemplary embodiments of a level shifter that may operate under the control of the controller 63 to adjust the voltage level of a signal to be compatible with the electrical specifications for the type of optical module 55 inserted into the socket 51 are described in (1) commonly-assigned U.S. patent Ser. No. 16/457,071, entitled "Systems and Methods for Communicating High Speed Signals in a Communication Device" and filed on Jun. 28, 2019, which is incorporated herein by reference and (2) commonly-assigned U.S. Provisional Patent Application No. 63/041,558, entitled "Systems and Methods for Communicating High Speed Signals in a Communication Device" and filed on Jun. 19, 2020, which is incorporated herein by reference.

Now, therefore, the following is claimed:

1. An optical line terminal for interfacing with any of a plurality of types of optical modules, wherein each of the types of optical modules corresponds to a respective optical protocol or combination of optical protocols for communicating with a plurality of optical network terminals through an optical network, comprising:
    a socket for receiving an optical module;
    optical line terminal (OLT) circuitry configured to encapsulate first data for transmission through the optical network and to communicate with the optical network terminals for controlling upstream transmissions through the optical network by the optical network terminals, the OLT circuitry configured to transmit the first data and the first control information to a first optical module mated with the socket, the OLT circuitry configured to receive second data and second control information from the first optical module; and
    a controller configured to control the OLT circuitry to selectively operate in a plurality of operational modes, including at least a first operational mode and a second operational mode, the controller configured to identify a module type for the first optical module and to select one of the first operational mode and the second operational mode based on the identified module type, the controller further configured to control the OLT circuitry to operate in the selected operational mode when the first optical module is mated with the socket, wherein the OLT circuitry is electrically and operationally compatible with a first type of optical module when operating in the first operational mode, and wherein the OLT circuitry is electrically and operationally compatible with a second type of optical module when operating in the second operational mode.

2. The optical line terminal of claim 1, wherein the controller is configured to determine when the socket is mated with the first optical module, and wherein the controller is configured to communicate with the first optical module, when the first optical module is mated with the socket, for identifying the module type for the first optical module.

3. The optical line terminal of claim 1, wherein the first type of optical module corresponds to Multi-PON protocol.

4. The optical line terminal of claim 3, wherein the second type of optical module corresponds to Gigabit-capable Passive Optical Network (GPON) protocol or XGS-PON protocol.

5. The optical line terminal of claim 4, wherein the socket has a receptacle for receiving a pin of the first optical module, and wherein the controller is configured to control the OLT circuitry such that (1) the receptacle is electrically coupled to ground of the OLT circuitry when an optical module of the second type is mated with the socket and (2) the receptacle is electrically isolated from the ground of the OLT circuitry when an optical module of the first type is mated with the socket.

6. The optical line terminal of claim 4, wherein the socket has a receptacle for receiving a pin of the first optical module, wherein the controller is configured to control the OLT circuitry such that (1) the receptacle is electrically coupled to ground of the OLT circuitry when an optical module of the second type is mated with the socket and (2) the OLT circuitry transmits or receives a signal through the receptacle when an optical module of the first type is mated with the socket.

7. The optical line terminal of claim 1, wherein the plurality of operational modes includes a third operational mode, wherein the OLT circuitry is electrically and operationally compatible with a third type of optical module when operating in the third operational mode, wherein the first type of optical module corresponds to Multi-PON protocol, wherein the second type of optical module corresponds to Gigabit-capable Passive Optical Network (GPON) protocol, and wherein the third type of optical module corresponds to XGS-PON protocol.

8. The optical line terminal of claim 1, wherein the controller is configured to control the OLT circuitry to operate in a safe mode in response to a determination that the socket is not mated with an optical module, and wherein the OLT circuitry is electrically compatible with the first type of optical module and the second type of optical module when operating in the safe mode.

9. The optical line terminal of claim 8, wherein the plurality of operational modes includes a third operational mode, wherein the OLT circuitry is electrically and operationally compatible with a third type of optical module when operating in the third operational mode, wherein the OLT circuitry is electrically compatible with the third type of optical module when operating in the safe mode, wherein the first type of optical module corresponds to Multi-PON protocol, wherein the second type of optical module corresponds to Gigabit-capable Passive Optical Network (GPON) protocol, and wherein the third type of optical module corresponds to XGS-PON protocol.

10. The optical line terminal of claim 8, wherein the OLT circuitry is configured to process a control signal from the first optical module in the first operational mode, and wherein the OLT circuitry is configured to ignore the control signal in the safe mode.

11. The optical line terminal of claim 10, wherein the control signal is a transmit fault signal.

12. The optical line terminal of claim 1, wherein:
    the socket has a first receptacle for receiving and electrically mating with a first conductive pin of the first optical module,
    the socket has a second receptacle for receiving and electrically mating with a second conductive pin of the first optical module,
    the first receptacle is electrically connected to ground of the OLT circuitry,
    the first optical module electrically couples the first conductive pin to the second conductive pin,
    the selected operational mode is the second operational mode; and
    the OLT circuitry has a capacitor and a circuit electrically connected to the second receptacle through the capacitor, the circuit configured to communicate a data signal via the second receptacle in the first operational mode.

13. The optical line terminal of claim 12, wherein the first optical module electrically couples the first conductive pin and the second conductive pin to ground of the first optical module, and wherein the capacitor is configured to provide direct current (DC) isolation between the circuit and the ground of the first optical module in the second operational mode.

14. The optical line terminal of claim 12, wherein the controller is configured to control the OLT circuitry to operate in a safe mode in response to a determination that the socket is not mated with an optical module, wherein the OLT circuitry is electrically compatible with the first type of optical module and the second type of optical module when operating in the safe mode, and wherein the capacitor is configured to provide direct current (DC) isolation between the circuit and the first optical module in the second operational mode.

15. The optical line terminal of claim 12, wherein the first optical module is of the first type, and wherein the first type corresponds to Multi-PON.

16. The optical line terminal of claim 12, wherein the data signal has a data rate greater than 800 Megabits per second.

17. The optical line terminal of claim 1, wherein first optical module is configured to store, in a register, module data indicative of the first optical module, and wherein the controller is configured to receive the module data from the first optical module and identify the module type based on the module data.

18. The optical line terminal of claim 17, wherein the module data includes an identifier of the first optical module, wherein the controller is configured to store data correlating the identifier with the module type, and wherein the controller is configured to select one of the first operational mode and the second operational mode based on the data correlating the identifier with the module type.

19. The optical line terminal of claim 17, wherein the controller is configured to communicate with the first optical module in accordance with I²C for retrieving the module data from the register.

20. A method for interfacing an optical line terminal with any of a plurality of types of optical modules, wherein each of the types of optical modules corresponds to a respective optical protocol or combination of optical protocols for communicating with a plurality of optical network terminals through an optical network, comprising:
encapsulating, with optical line terminal (OLT) circuitry of the OLT, first data for transmission through the optical network;
communicating with the optical network terminals via the OLT circuitry for controlling upstream transmissions through the optical network by the optical network terminals;
transmitting, with the OLT circuitry, the first data and the first control information to a first optical module mated with a socket of the OLT;
receiving, with the OLT circuitry, second data and second control information from the first optical module;
controlling, with a controller, the OLT circuitry to selectively operate in a plurality of operational modes, including at least a first operational mode and a second operational mode;
identifying, with the controller, a module type for the first optical module;
selecting, with the controller, one of the first operational mode and the second operational mode based on the identified module type; and
controlling, with the controller, the OLT circuitry to operate in the selected operational mode when the first optical module is mated with the socket,
wherein the OLT circuitry is electrically and operationally compatible with a first type of optical module when operating in the first operational mode, and wherein the OLT circuitry is electrically and operationally compatible with a second type of optical module when operating in the second operational mode.

21. The method of claim 20, further comprising:
determining, with the controller, when the socket is mated with the first optical module;
communicating with the first optical module via the controller when the first optical module is mated with the socket; and
identifying, with the controller, the module type for the first optical module based on information received by the controller from the first optical module.

22. The method of claim 20, wherein the first type of optical module corresponds to Multi-PON protocol, and wherein the second type of optical module corresponds to Gigabit-capable Passive Optical Network (GPON) protocol or XGS-PON protocol.

* * * * *